(No Model.)
C. F. BINDER.
DEVICE FOR MIXING PULVERIZED SUBSTANCES WITH LIQUIDS.
No. 256,274. Patented Apr. 11, 1882.
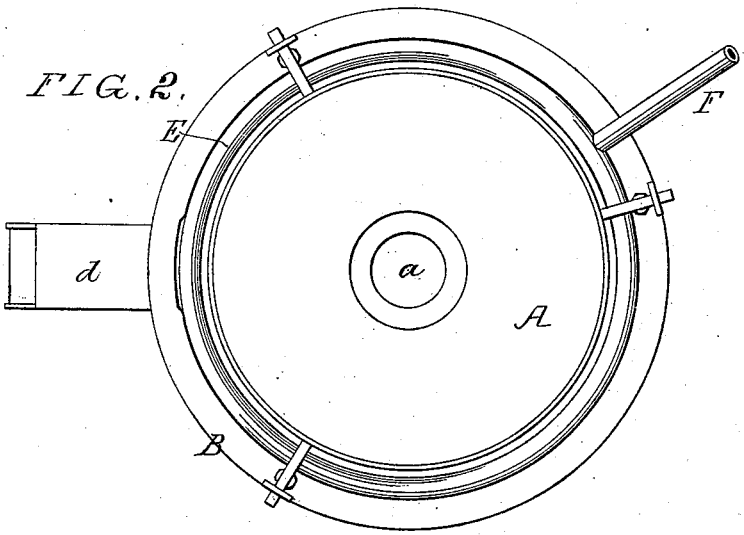
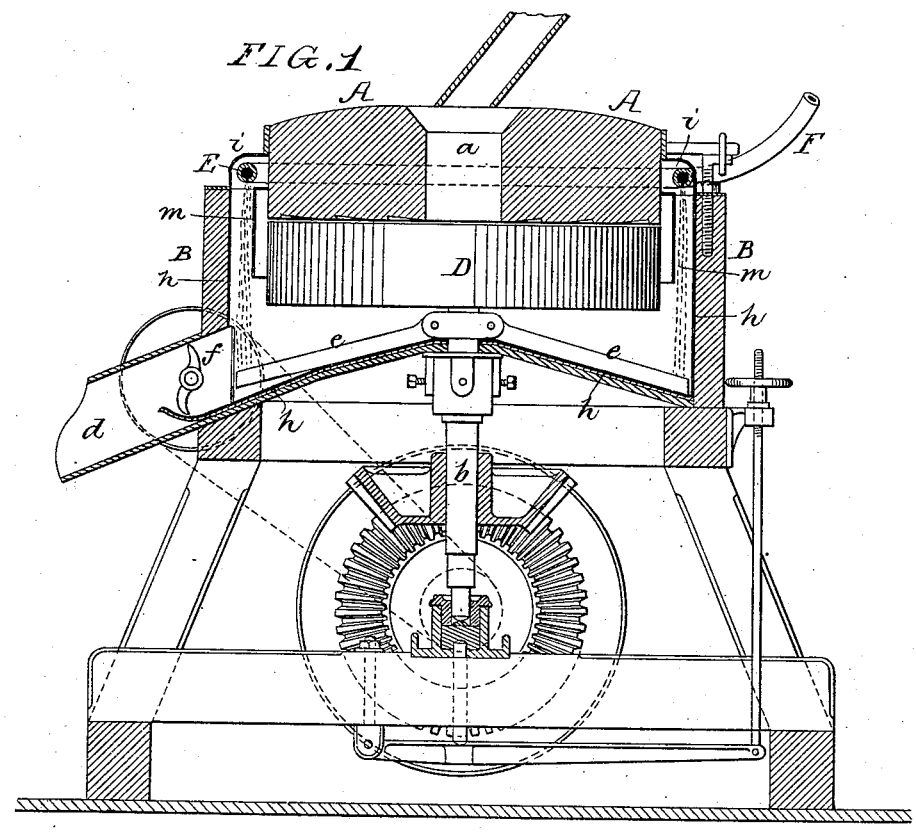
Witnesses:
Harry Drury
James J. Tobins
Inventor:
Charles F. Binder
by his Attorneys
Howson and Sons

UNITED STATES PATENT OFFICE.

CHARLES F. BINDER, OF CAMDEN, NEW JERSEY.

DEVICE FOR MIXING PULVERIZED SUBSTANCES WITH LIQUIDS.

SPECIFICATION forming part of Letters Patent No. 256,274, dated April 11, 1882.

Application filed December 5, 1881. (No model.)

*To all whom it may concern:*

Be it known that I, CHARLES F. BINDER, a citizen of the United States, residing in Camden, New Jersey, have invented certain Improvements in Devices for Mixing Pulverized Substances with Liquids, of which the following is a specification.

The main feature of my invention consists in combining grinding mechanism with a pipe or pipes through which liquid may be discharged onto the ground or pulverized material after the latter has been discharged, or while it is being discharged, from the grinding-surfaces, my invention being especially applicable to the admixture of sulphuric acid with pulverized phosphates.

In the accompanying drawings, Figure 1 is a vertical section of a grinding-mill combined with appliances whereby the desired admixture of the ground material with liquid may be carried into effect, and Fig. 2 a plan view of Fig. 1.

A is the upper or fixed stone of a grinding-mill, which is suitably supported on the casing B, and has a central eye, *a*, into which the material to be ground is fed.

D is the lower stone, which is hung to the revolving spindle *b*, the latter being vertically adjustable, as usual, so as to vary the pressure of the lower stone against the upper stone.

The casing B has a discharge-spout, *d*, at one side, and on the shaft *b* are a pair of arms, *e*, which rotate in contact with the bottom of the casing, and serve to scrape the material therefrom and into the spout *d*, in which is arranged a rotating mixer, *f*.

Surrounding the upper stone, A, is an annular pipe, E, perforated on the under side, and having a branch, F, whereby a supply of liquid is conveyed to the pipe E from a suitably-located reservoir, said liquid escaping from the pipe E in a number of small jets or streams around the stones A and D, so that as the ground material issues in a stream from between the stones and falls into the bottom of the casing B it is brought into intimate contact with the liquid, and absorbs or becomes thoroughly combined therewith, the mixture being completed by the action of the arms *e e* in the bottom of the casing and the rotating mixer *f* in the discharge-spout.

Where acid is the liquid employed, as in the manufacture of manure from phosphate rock, I provide the casing B with a leaden lining, *h*, and carry the same up over the pipe E, so as to form a hood, *i*, and prevent the escape of fumes from the casing, a leaden guard, *m*, being secured to the upper stone, A, so as to prevent the injury to the stones which would result if the acid came into contact therewith or gained access to the space between the stones.

By the means above described I effect very thoroughly and in a simple manner the intimate admixture of the powdered and liquid substances, and am enabled to dispense with the separate mixing-machines now employed to effect the same object.

In some cases the pipe E may be arranged in the lower part of the casing, below the stone D, instead of in the upper part of the casing; but the latter location is preferred.

It is not essential in carrying out my invention that millstones with grinding-surfaces in a horizontal plane should be employed, as other well-known grinding appliances may be used, in connection with pipes or ducts, with the view of effecting in and by one combination of parts the operation of grinding and the subsequent operation of mixing liquid with the ground material.

I claim as my invention—

1. The combination of grinding mechanism with a pipe or pipes, whereby liquid may be brought into intimate contact and mixed with the material after the latter is ground, substantially as set forth.

2. The combination of the millstones and the casing B with the annular pipe E, having perforations through which jets of liquid are discharged downward between the stones and casing, substantially as specified.

3. The combination of the millstones and their casing with the liquid-supplying pipe and the scraping and mixing arms *e*, as set forth.

4. The combination of the millstones, the liquid-supplying pipe, and the casing having a lining, $h$, as set forth.

5. The combination of the millstones, the casing, the liquid-supplying pipe E, and the hood $i$, as set forth.

6. The combination of the millstones, the casing, and the pipe E with the guard $m$, as specified.

In testimony whereof I have signed my name to this specification in the presence of two subscribing witnesses.

CHARLES F. BINDER.

Witnesses:
 HARRY DRURY,
 HARRY SMITH.